P. YOUNG.
Wheel Plow.
No. 56,662.
Patented July 24, 1866.
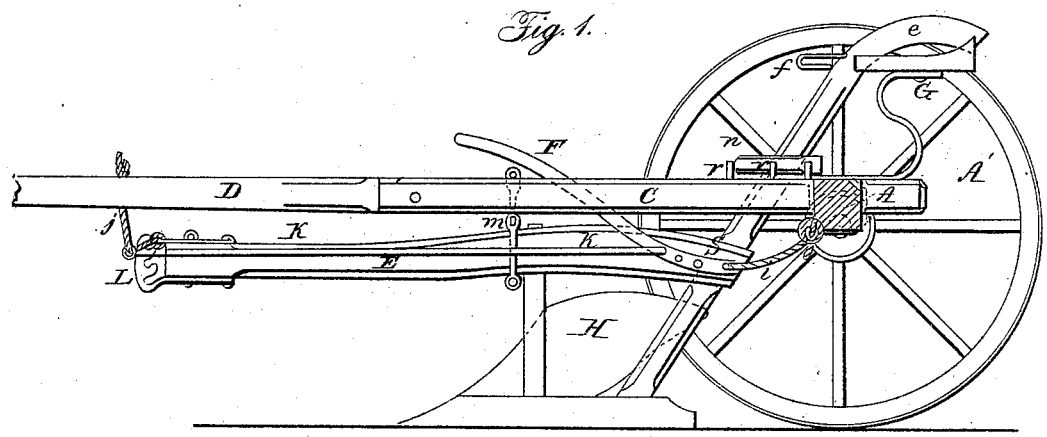
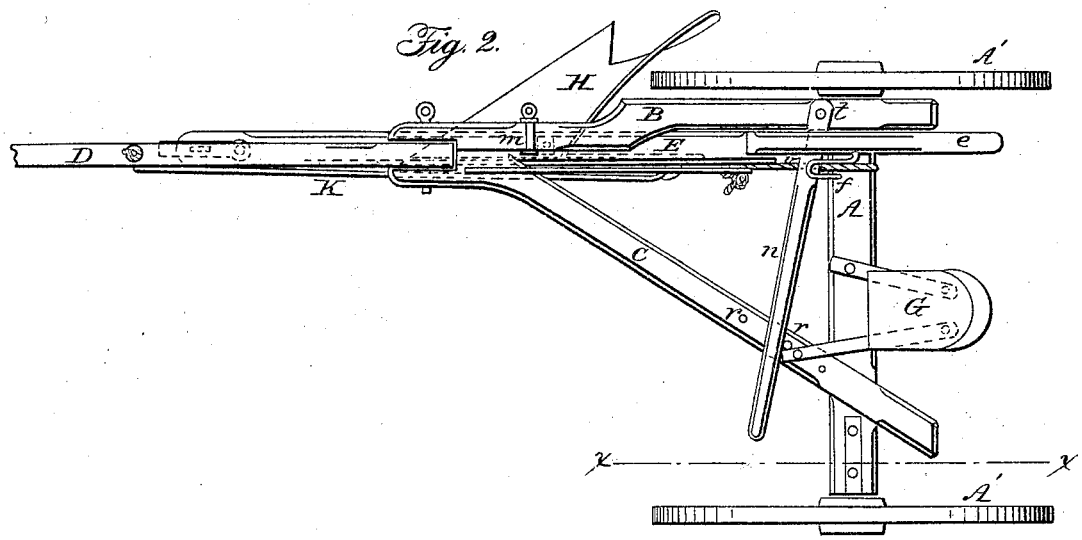
Witnesses:
Alex F. Roberts
J. M. Covington
Inventor:
Peter Young
per Munn & Co.
Attorneys

UNITED STATES PATENT OFFICE.

PETER YOUNG, OF EL PASO, ILLINOIS.

IMPROVEMENT IN SULKY-PLOWS.

Specification forming part of Letters Patent No. 56,662, dated July 24, 1866.

*To all whom it may concern:*

Be it known that I, PETER YOUNG, of El Paso, in the county of Woodford and State of Illinois, have invented a new and Improved Sulky-Plow; and I do hereby declare that the following is a full, clear, and exact description thereof, which will enable others skilled in the art to make and use the same, reference being had to the accompanying drawings, forming part of this specification, in which—

Figure 1 is a vertical longitudinal section taken in the line $x\ x$, Fig. 2, and Fig. 2 is a top view of my invention.

Similar letters of reference in the different figures indicate corresponding parts.

This invention relates to certain new and useful improvements in the mode of operating that class of plows known as "sulky-plows," whereby the movements of the plows are managed and controlled with the greatest facility, as hereinafter explained.

A, Fig. 2, is the axle of the vehicle, which, in connection with the frame-pieces B C, Fig. 2, forms a trilateral frame-work, to the fore end of which is pivoted the tongue or pole D, and the whole being mounted on wheels A' A'.

H, Fig. 1, is the plow. E is the beam, and $e$ the handle thereof. The plow-beam E is yoked to the frame by a shackle or yoke, $m$, and is also attached to the pole D at the front by a cord, $j$, the said cord $j$ being rove through an eye on the end of a rod, $k\ k$, which connects at its other end with a lever, F, which is pivoted to the rear end of the plow-beam by a pivot, $s$, the short end of the lever F connecting with the axle A by means of a cord, $i$.

$n$, Fig. 2, is a horizontal lever, which is pivoted to the frame-work at $t$, and has a notch, $v$, on its front edge, which is made to engage with the upright or handle $e$ of the plow by moving the swinging end of lever $n$ to the front.

Its operation is as follows: The team is attached to the clevis L of the plow in the usual manner, and the yoke $m$ draws the supporting-vehicle A B C, the pole D occupying the neck-yoke of the harness, as usual, for directing and steadying the vehicle. The plow H E, as shown in Fig. 1, is in the position for plowing, the lever F being thrown to the front and the lever $n$ thrown back. In this position the plow is operated for plowing by the driver in his seat G by means of the single handle $e$; but when the plow is to be elevated or swung clear of the ground the lever F is thrown back into the hook or rack $f$, and this draws back on the bight of the cord $j$ by means of the rod $k$, so that the forward end of the plow-beam is drawn up to D, and at the same time the rear end of the plow is elevated by the cord $i$ acting as a fulcrum for the lower end of the lever F. The lever $n$, when thrown forward, engages with the handle $e$ and steadies the plow in position, and this lever $n$ is retained in its position by the pins $r\ r$.

By these means I provide appliances for managing this class of plows which are simple and inexpensive and which are easily operated.

Having thus described my invention, what I claim as new, and desire to secure by Letters Patent, is—

1. The cords $j$ and $i$, sliding rod $k$, lever F, and yoke $m$, all arranged and operating as and for the purpose set forth.

2. In combination with the above, the steadying-lever $n$, arranged and operating substantially as herein shown and described.

PETER YOUNG.

Witnesses:
 JOHN YOUNG,
 E. CAZALET.